(No Model.)
F. L. UNION.
FILTERING MEANS FOR SEWAGE WATER.
No. 556,594. Patented Mar. 17, 1896.
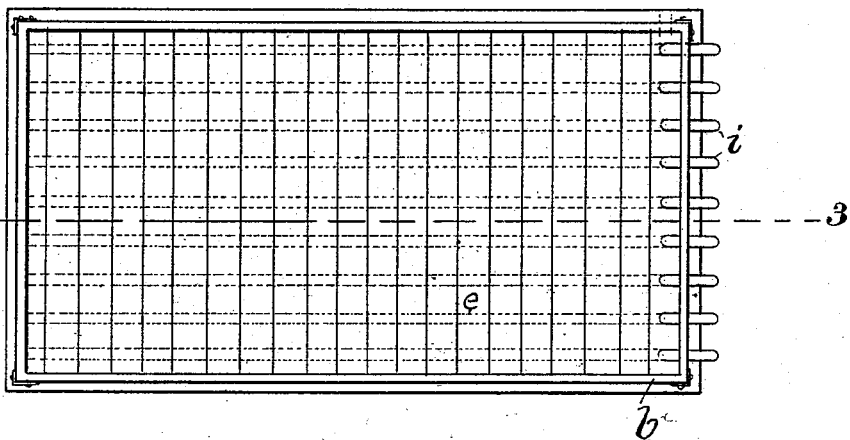
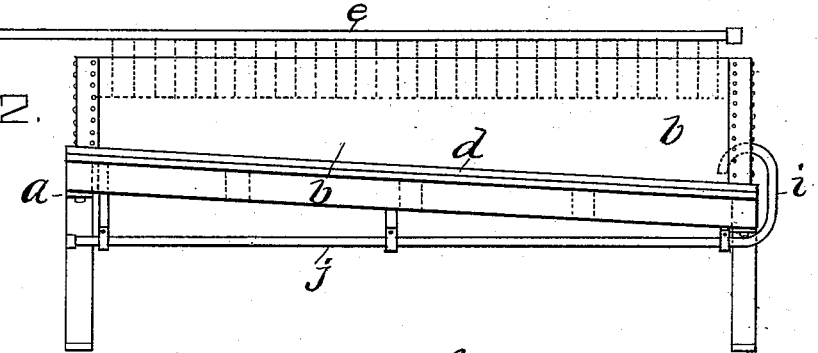
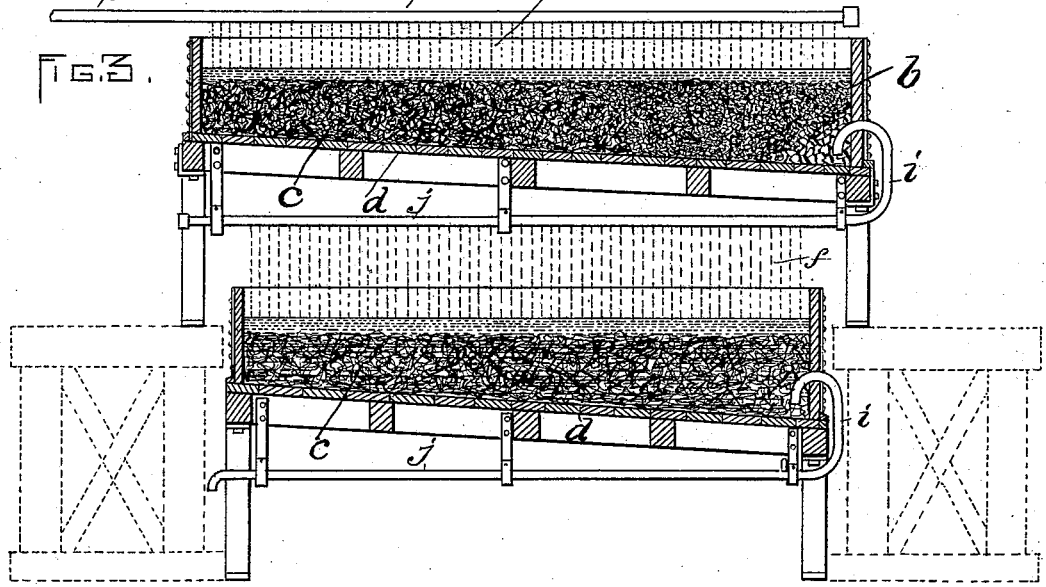
WITNESSES
INVENTOR

UNITED STATES PATENT OFFICE.

FRANK L. UNION, OF BRAINTREE, MASSACHUSETTS.

FILTERING MEANS FOR SEWAGE-WATER.

SPECIFICATION forming part of Letters Patent No. 556,594, dated March 17, 1896.

Application filed August 30, 1894. Serial No. 521,684. (No model.)

*To all whom it may concern:*

Be it known that I, FRANK L. UNION, of Braintree, in the State of Massachusetts, have invented certain new and useful Improvements in Filtering Means for Sewage-Water, of which the following is a specification.

This invention has relation to the aeration and filtration of sewage-water after the solids and semisolids have been separated therefrom, the object of the invention being to so filtrate and purify sewage-water under the circumstances above named as that it may be discharged into a water-way without contaminating the same.

To this end the invention consists in distributing the discharged sewage-water in a substantially even proportion over the upper surface of a filter-bed having a solid or watertight bottom, collecting the filtered water and siphoning or otherwise drawing it off free from the filtering material or any substances lodged in the same and discharging the water in a clear condition.

Reference is to be had to the annexed drawings, and to the letters marked thereon, forming a part of this specification, the same letters designating the same parts or features, as the case may be, wherever they occur.

Of the drawings, Figure 1 is a plan view of my invention. Fig. 2 is a side elevation of the same, the supporting means being shown in section. Fig. 3 is a sectional view, taken on the line 3 3 of Fig. 1, showing the duplex arrangement of my invention.

In the drawings, $a$ designates the supporting-frame, which may be of any form and material adapted to the use of my invention.

$b$ designates the frame of the tank or box for the containment and support of the filtering-bed $c$. The bottom $d$ of the tank is made on an incline from one side or end to the other, as is indicated in Figs. 1 and 3.

In the drawings, the tank or box $b$ for supporting the filtering-bed is shown in Fig. 1 as being narrower than its length; but in actual practice I propose to construct the tanks or beds of any width or length. In cases where a large amount of sewage-water is to be cared for the tank will necessarily be of greater width or length than where a smaller amount of water has to be taken care of.

The filtering-bed $c$ may be composed of charcoal, sand, or charcoal and sand combined, or any other suitable filtering substance, and the said filtering substance will be arranged in the tank so that its upper surface will be substantially level, and provision will be made at a lower portion, as at $d$ of its inclined bottom, so that the water filtered through the bed may collect at said point $d$ in a substantially free condition—that is, substantially free from fine sand or filtering material; or it may be entirely free from such material.

$e$ designates a series of parallel pipes or troughs which receive the sewage-water from the source of supply and are arranged substantially in level or horizontal position to the filtering-bed, so that the water in the troughs may overflow therefrom, as shown at $f$, and distribute water evenly at the surface of the bed.

For the sake of perspicuity in Fig. 1 the troughs $e$ are omitted, but the number will be sufficient to accomplish, as before stated, a substantially even distribution of the water on the bed. These troughs may not extend farther than from one side of the bed, as at $g$, to the other, as at $h$, from which point to the source of supply they may consist of pipes. It is preferable to have the distributing instrumentalities $e$ in the form of troughs rather than that of perforated pipes, (which may also be employed without departing from the spirit or nature of the invention.)

In the use of pipes with perforations there is great liability of sediment in the water collecting in the perforations and closing the same, whereas with the use of troughs no liability of obstructing the even distribution of the water over the filtering-bed is liable to occur.

By having the series of troughs arranged parallel I am enabled to distribute the water evenly over the fitering material so a large body of water is not delivered to it at one point or in a single line.

$i$ designates pipes bent to form substantial siphons, the inner ends of said pipes extending through walls of the tanks and down to the point near the bottom, as at $d$, where the water is left comparatively free from the surrounding filtering material. The lower ends of the said siphon-pipe is connected with the pipe *j*, which extends rearward under the filtering-bed and down the incline to the point where it may discharge the filtered water into any suitable receptacle.

The object of conducting the water to a single point or line, as at *d*, and leaving the same free and providing siphons for drawing it off is that no sediment, solid or semisolid substance, may be carried off with it, and, furthermore, that the pipes conducting the filtered water away to be discharged may not themselves become obstructed or filled with the sediment from the filtered water.

In most instances where the sewage-water is not very foul the single filtering bed and apparatus, such as has just been described, will fully answer the purpose of my invention. In other cases where the sewage-water is quite foul it may be necessary to employ a second filtering apparatus, as shown in Fig. 3, and in this instance I form a pipe *j*, connected with the siphon *i* as a trough, substantially the same as the trough *e*, and provide another filtering bed and tank beneath the same, substantially the same as the tank *d*, before described, so that the water from the troughs *j* will run down and be distributed over the surface of the lower filtering-bed *c*, as shown in the lower part of Fig. 3, which filtering-bed will be constructed substantially the same as the bed *c* and the water in which will be collected at the point *d* and drawn off by means of the siphon *i* and pipes *j* to be discharged, as before explained.

If need be, a third or even fourth filtering-bed may be supplied; but in ordinary cases it will not be necessary to use more than one or two.

When the filtering-bed becomes too foul for use, the filtering material therein may be removed and the sediment collected thereby employed for fertilizing or any other suitable purpose.

By forming the bottom of the filtering bed or tank substantially solid or water-tight and collecting the water at a single point or line in accordance with my invention provision is made for avoiding any waste of filtering material from the filtering-bed, and, furthermore, I am enabled to draw the water off in a slow and unagitated condition, so that it is of a character or condition permitting of its discharge into a common water-way without contaminating the same. It is necessary that this be done in this way and not by a pump or other means for forcibly drawing off the water, for if a pump were employed the solid substances would be drawn off with the water and the pipes would be clogged with the filtering material.

Having thus explained the nature of the invention and described a way of constructing and using the same, though without attempting to set forth all of the forms in which it may be made or all of the modes of its use, it is declared that what is claimed is—

1. An apparatus for aerating and filtering sewage-water comprising in its construction a filtering-bed having a water-tight bottom and adapted to collect the water at a single point or line, filtering material partially filling said bed and having its top surface substantially horizontal, means for distributing the water to be treated substantially even over the filtering-bed and siphoning means for drawing off water from the point or line of collection, as set forth.

2. An apparatus for aerating and filtering sewage-water comprising an upper filtering-bed, a lower filtering-bed, each having a water-tight inclined bottom whereby the filtered water may be collected at the lowest point, a series of parallel troughs arranged over the lower filtering-bed, for distributing the water substantially even thereover, means for siphoning the water from said lowest point in the upper bed to the said troughs over the lower bed, and means for siphoning the water from said lower bed substantially as set forth.

In testimony whereof I have signed my name to this specification, in the presence of two subscribing witnesses, this 27th day of June, A. D. 1894.

FRANK L. UNION.

Witnesses:
ARTHUR W. CROSSLEY,
EUGENE WHITCOMB.